United States Patent [19]

Hobson

[11] Patent Number: 4,622,859
[45] Date of Patent: Nov. 18, 1986

[54] TRANSFER GEAR ASSEMBLY

[75] Inventor: Donald E. Hobson, Leo, Ind.

[73] Assignee: Dana Corporation, Toledo, Ohio

[21] Appl. No.: 658,572

[22] Filed: Oct. 9, 1984

[51] Int. Cl.[4] .................... F16H 1/14; F16H 57/02; F16D 25/08

[52] U.S. Cl. .................... 74/15.88; 74/417; 74/606 R; 192/85 V; 192/112

[58] Field of Search ............ 74/15.86, 15.88, 606 R, 74/417; 192/85 V, 85 C, 112

[56] References Cited

U.S. PATENT DOCUMENTS

| | | | |
|---|---|---|---|
| 2,121,897 | 6/1938 | Wood | 74/15.88 |
| 2,213,196 | 9/1940 | Bartholomew | 74/15.88 |
| 2,890,775 | 6/1959 | Heinrich | 192/112 |
| 3,046,813 | 7/1962 | Bixby | 74/15.86 |
| 3,296,895 | 1/1967 | Karlsson | 74/15.86 |
| 3,347,341 | 10/1967 | Aurea | 74/606 R |
| 3,465,613 | 9/1969 | Henry-Biabaud | 74/606 R |
| 3,774,466 | 11/1973 | Bhatia | 74/417 |
| 3,993,155 | 11/1976 | Tkachenko | 74/606 R |
| 4,309,915 | 1/1982 | Nozawa et al. | 74/606 R |

*Primary Examiner*—Allan D. Herrmann
*Attorney, Agent, or Firm*—Robert M. Leonardi; Robert H. Johnson

[57] ABSTRACT

A transfer gear assembly connected to a transaxle in order to provide the transaxle with a power take-off. The transfer gear assembly includes a case with an access opening and a shaft connectable to the transaxle through a gear set by a clutch. The transfer gear assembly also includes an actuator for moving the clutch between its engaged and disengaged positions and a combined access opening cover and actuator shield fastened to the case.

2 Claims, 2 Drawing Figures

TRANSFER GEAR ASSEMBLY

BACKGROUND OF THE INVENTION

This invention is directed to drive trains, and more specifically to a transfer gear assembly.

BRIEF SUMMARY OF THE INVENTION

This invention relates to a transfer gear assembly intended to provide a transaxle with a power take-off. The transfer gear assembly includes a case with an access opening. Rotatably journalled in the case is a gear and first and second shafts. A clutch is disposed in the case and is actuatable between a disengaged position and an engaged position in which the gear is connected to the first shaft for conjoint rotation therewith. An actuator is mounted on the case externally thereof and adjacent said access opening. The actuator is operatively connected to the clutch and operable to actuate the clutch between the engaged and disengaged positions thereof. A combined cover plate and shield is fastened to the case and is disposed to cover the access opening and at least partially surround the actuator.

It is a principal object of my invention to provide an improved transfer gear assembly.

The above and other objects, features and advantages of my invention will become apparent upon consideration of the detailed description and appended drawing.

DETAILED DESCRIPTION OF THE PREFERRED EMBODIMENT

Figure 1:
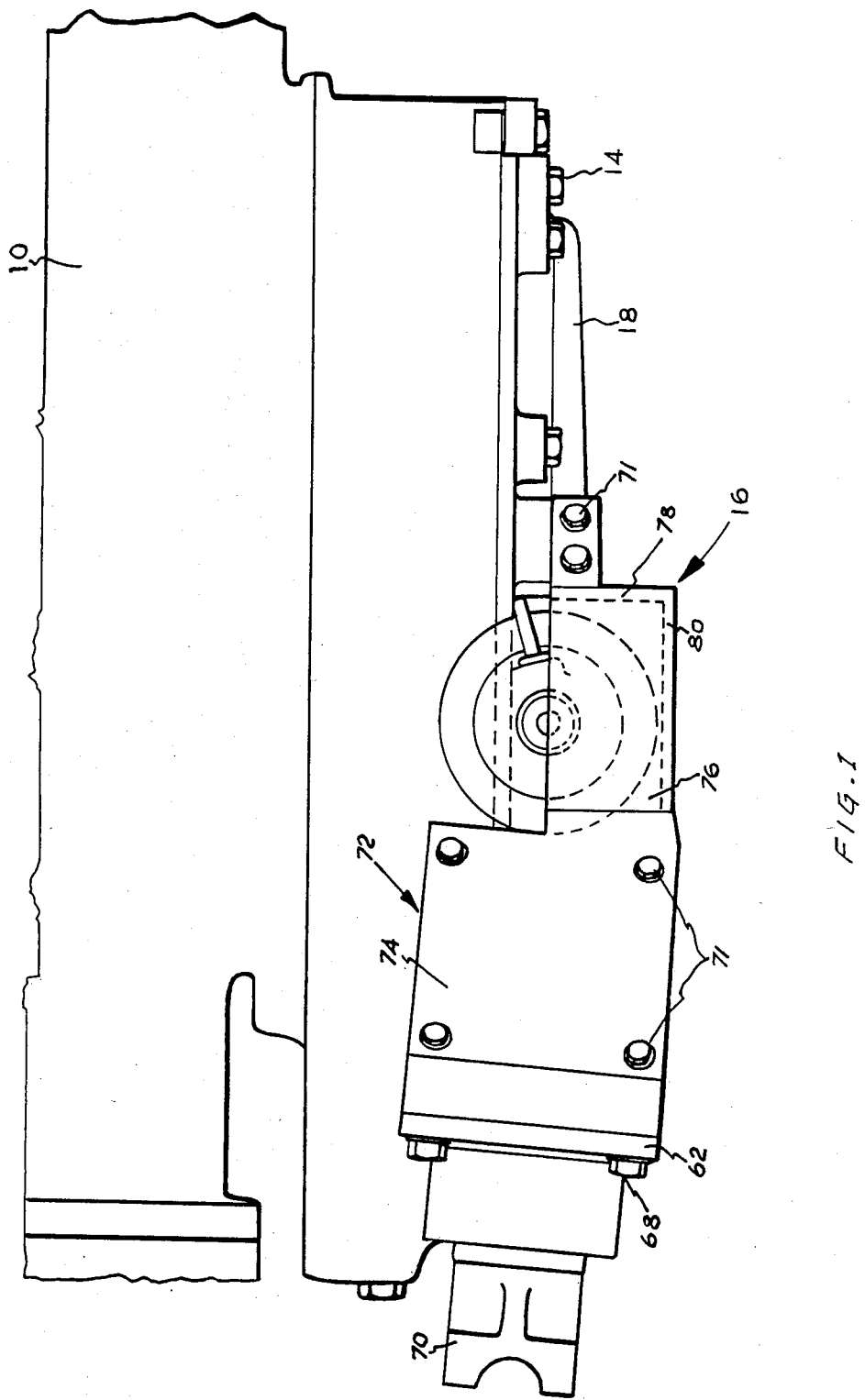
FIG. 1 is an elevation view showing my improved transfer gear assembly mounted on a transaxle.
Figure 2:
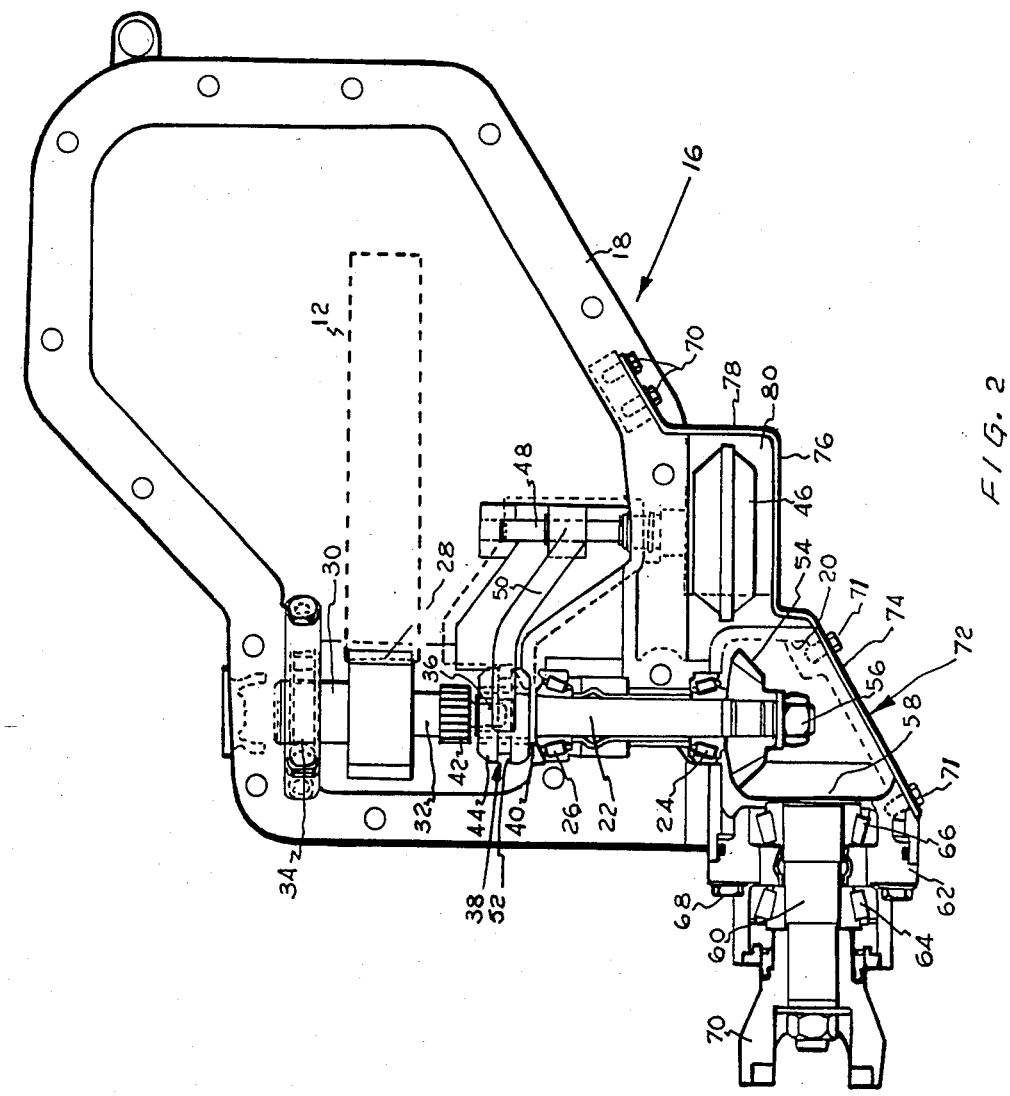
FIG. 2 shows a plan view of my improved transfer gear assembly.

Referring to the drawing, reference numeral 10 denotes a transaxle which includes a final drive gear 12 (FIG. 2). Connected to the bottom of transaxle 10 by a plurality of machine screws 14 is a transfer gear assembly 16 which serves to provide a power take-off for transaxle 10 and also serves to replace the oil pan normally attached to the bottom of transaxle 10.

Transfer gear assembly 16 includes a case 18 which is provided with an access opening 20. Assembly 16 also includes a shaft 22 journalled for rotation in case 18 by a pair of roller bearings 24 and 26.

Adjacent one end of shaft 22 there is located a gear 28. Gear 28 meshes with final drive gear 12 and is provided with a pair of shaft projections 30 and 32. Shaft 30 is journalled for rotation in case 18 by a bearing 34 and shaft 32 is journalled for rotation in the adjacent end of shaft 22 for conjoint rotation by means of a tooth clutch 38 which includes a set of teeth 40 on shaft 22 and a set of teeth 42 on shaft 32 and a clutch collar 44 movable between a disengaged position shown and an engaged position into mesh with teeth 42 so that shafts 32 and 22 are connected for conjoint rotation.

Attached to case 18 externally thereof and adjacent access opening 20 is a vacuum actuator 46 which includes a rod 48 that extends into case 18. Connected to rod 48 is an arm 50 which engages a groove 52 in collar 44 so that by energizing actuator 46 clutch 38 can be engaged or disengaged, as desired.

Connected to the end of shaft 22 opposite clutch 38 by means of a splined connection is a bevel gear 54 which is held in place on shaft 22 by a net 56 which threadably engages shaft 22. Meshing with bevel gear 54 is a second bevel gear 58 which is integral with a shaft 60 journalled for rotation in a sleeve 62 by a pair of roller bearings 64 and 66. Sleeve 62 is removably connected to case 18 by a plurality of machine screws 68. Connected to the outer end of shaft 60 is the yoke portion 70 of a universal joint.

Fastened to case 18 by a plurality of machine screws 71 is a combined access cover and actuator shield 72. Combined access cover and accuator shield 72 includes a first generally planar portion 74 which covers access opening 20 and second, third and fourth planar portions 76, 78 and 80, respectively, which are disposed at substantially right angles to each other and partially surround the external portion of actuator 46.

At this point it will be appreciated that my improved transfer gear assembly provides a construction which maintains adequate ground clearance, is readily manufactured and assembled and has the clutch actuator positioned and shielded to minimize the likelihood of damage by road hazards, such as objects that may be lying on the road or loose stones which are thrown up by the vehicle wheels.

While I have disclosed only a single embodiment of my invention, it will be understood that various changes and modifications can be made to it, and so the scope of my invention should be determined from the claims when construed in light of the prior art.

I claim:

1. A transfer gear assembly for use in a vehicle having a transaxle, said transaxle having a housing and an output gear, said transfer gear assembly comprising:

a case adapted to be carried by the transaxle housing, first and second axially spaced coaxial shafts rotatably journalled in said case, a first gear mounted on said first shaft for engagement with said output gear, a clutch actuable between a disengaged position and an engaged position to connect said first and second shafts for conjoint rotation, a second bevel gear fixed to said second shaft, a nut threaded onto said second shaft to secure said second bevel gear, a third shaft mounted in said case having an axis of rotation oriented transverse to the axis of rotation of said first and second shafts, and a third bevel gear fixed to said third shaft and engaged with said second bevel gear, said case having a wall disposed at an oblique angle relative to the axes of rotation of said first and second coaxial shafts and said third shaft, said wall defining an access opening aligned with the axis of rotation of said first and second coaxial shafts to allow insertion and removal of said nut, said second gear, and said second and third shafts, a vacuum actuator having a diaphragm canister mounted externally on said case adjacent and spaced from said access opening, said vacuum actuator having a rod extending parallel to the axis of said first and second coaxial shafts into said case and into engagement with said clutch, said vacuum actuator for actuating said clutch between said engaged and disengaged positions, and a combined cover plate and shield attached to said case covering said access opening and at least partially surrounding said diaphragm canister, wherein said combined cover plate and shield has a first planar portion disposed at said oblique angle to the axis of rotation of said first, second and third shafts to fit flush against said wall defining said access opening, and wherein the portion of said combined cover plate and shield surrounding said at least a portion of said vacuum canister is spaced from said case to accommodate the external mounting of said diaphragm canister.

2. The assembly set forth in claim 1 wherein said combined cover plate and shield includes a second planar portion integral with said first planar portion and disposed substantially parallel to the axis of said third shaft, a third planar portion integral with said second planar portion and disposed substantially parallel to the axis of said first and second shafts, and a fourth planar portion integral with said second planar portion and disposed substantially at a right angle to said second and third planar portions, wherein said second, third and fourth planar portions are spaced from said case, and together with a portion of said case, form a cavity externally of said case in which said diaphragm canister is positioned.

* * * * *